UNITED STATES PATENT OFFICE.

JOSIAH DAILY, OF MADISON, INDIANA.

FLAVORING-EXTRACT FOR SIRUP AND SUGAR.

SPECIFICATION forming part of Reissued Letters Patent No. 10,285, dated February 13, 1883.

Original No. 261,315, dated July 18, 1882. Application for reissue filed January 16, 1883.

*To all whom it may concern:*

Be it known that I, JOSIAH DAILY, of Madison, in the county of Jefferson and State of Indiana, have invented a new and useful Method of Flavoring Sirups and Sugars and other Saccharine Matter, of which the following is a full, clear, and exact specification.

The object of my invention is to impart to saccharine matter the flavor of maple-sirup; and the invention consists in the use of an extract of hickory for giving the desired flavor.

The extract is to be obtained in any convenient manner, such as making a decoction of the hickory bark or wood, or percolating liquid through the same, or drawing off the sap from the tree. The bark or wood of the hickory tree may be ground to facilitate the extraction of its principle and the extract may be made more or less strong by increasing or diminishing the quantity of bark or wood, or by boiling the extract for a longer or shorter time.

In preparing sirups, I ordinarily add about three table-spoonfuls of the decoction to a gallon of heated or boiling sirup. Of course the stronger the extract the less the quantity required for flavoring a given amount of sirup. The sirup may be manufactured from any kind of saccharine matter or mixture of saccharine matters, or the sirups ordinarily found in the market may be used. The effect of the extract or decoction is to give to the sirup the flavor of the maple, producing a sirup which cannot be distinguished from genuine maple-sirup.

The high price of maple-sirup, as well as its scarcity throughout the country, renders this improved sirup of great value, since a good substitute for maple-sirup is thus produced, which comes within the reach of all.

It is evident that the flavored sirup may be boiled down and a sugar resembling maple-sugar in taste may be produced.

In defining the limits of my invention, I would state that I do not claim broadly the use of extracts of the wood or bark of trees for flavoring sirups or sugars, as I am aware that a decoction made from the wood of the maple has been used for the same purpose. The maple, however, belongs to a different genus of tree from that of the hickory, and it is well known that extracts of wood as a rule differ from each other in taste, according to the nature of the tree. I have discovered that the hickory tree will produce the flavor of the maple, and I therefore claim as my invention the use of the hickory-extract wherever it may be employed to impart an agreeable flavor.

Having thus described my invention, what I claim, and desire to secure by Letters Patent, is—

1. The method herein described of flavoring saccharine matter, including sirup and sugar, which consists in treating or impregnating the same with the principle or extract of hickory, as specified.

2. An improved sirup or sugar consisting of any suitable saccharine matter flavored with an extract of hickory, substantially as described.

JOSIAH DAILY.

Witnesses:
A. G. LYNE,
SOLON C. KEMON.